US011792097B1

(12) United States Patent
Chraim et al.

(10) Patent No.: US 11,792,097 B1
(45) Date of Patent: Oct. 17, 2023

(54) ESTIMATING NETWORK AVAILABILITY USING CONNECTIVITY AND PERFORMANCE DATA

(71) Applicant: AMAZON TECHNOLOGIES, INC., Seattle, WA (US)

(72) Inventors: Fabien Chraim, Sacramento, CA (US); John William Evans, Frome (GB); Marina Thottan, Westfield, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/958,163

(22) Filed: Sep. 30, 2022

(51) Int. Cl.
*H04L 41/12* (2022.01)
*H04L 43/067* (2022.01)
*H04L 45/00* (2022.01)

(52) U.S. Cl.
CPC ............ *H04L 43/067* (2013.01); *H04L 41/12* (2013.01); *H04L 45/22* (2013.01)

(58) Field of Classification Search
CPC ........ H04L 43/067; H04L 41/12; H04L 45/22
See application file for complete search history.

(56) References Cited

U.S. PATENT DOCUMENTS

| | | | | |
|---|---|---|---|---|
| 9,613,341 | B2* | 4/2017 | Shivakumar | G06Q 30/0282 |
| 2008/0052394 | A1* | 2/2008 | Bugenhagen | H04L 45/28 |
| | | | | 709/224 |
| 2013/0013807 | A1* | 1/2013 | Chrapko | H04L 41/12 |
| | | | | 709/238 |
| 2013/0196685 | A1* | 8/2013 | Griff | H04W 24/00 |
| | | | | 455/456.1 |
| 2014/0321273 | A1* | 10/2014 | Morrill | H04L 12/6418 |
| | | | | 370/230 |
| 2017/0024749 | A1* | 1/2017 | Barathy | G06Q 30/0277 |
| 2021/0258243 | A1* | 8/2021 | Narasimhan | H04L 45/34 |
| 2022/0321262 | A1* | 10/2022 | Bajaj | H04L 1/0041 |
| 2023/0070701 | A1* | 3/2023 | Wang | H04L 41/5012 |

* cited by examiner

*Primary Examiner* — Aftab N. Khan
(74) *Attorney, Agent, or Firm* — Klarquist Sparkman, LLP

(57) ABSTRACT

In computing networks, path availabilities are estimated according to the present disclosure. The path availabilities may be calculated based on connectivity and performance measurements provided by multiple data sources, including passive, active, and/or route monitoring data sources. The measurements may be classified using network topology and processed to determine availability indicators corresponding to the measurements. The availability indicators may be aggregated to determine an overall path availability score for a path associated with the indicators.

20 Claims, 9 Drawing Sheets

ESTIMATING NETWORK AVAILABILITY USING CONNECTIVITY AND PERFORMANCE DATA

BACKGROUND

Large computer networks, often used in cloud computing or other applications, may contain hundreds or thousands of network devices of several types, such as switches, routers, and hubs. Data from a source endpoint (e.g., a host computer or a network device connecting to another network) travels to a destination endpoint via paths defined by links between multiple devices of the network. In packet-switched networks, the data is formatted into units, termed packets, that travel along the paths between endpoints. Availability of the network or certain paths in the network may be affected by factors of service performance (e.g., packet loss, jitter, latency, etc.) and connectivity (e.g., routing, reachability, etc.). Knowledge of availability of network paths or regions may assist a network operator in identifying issues in the network and evaluating whether the network is fulfilling service performance commitments for customers or clients of the network.

DETAILED DESCRIPTION

Availability can be defined as including parameters relating to both connectivity and acceptable performance. For example, a network may be considered to be available or have above a threshold level of availability when it is connected, accessible, accepting traffic, able to route traffic from one endpoint to next, able to perform basic functions, etc., and as well when it is delivering acceptable performance (e.g., as defined along multiple dimensions including loss, latency, jitter, etc.). In other systems, models may be used for performing an evaluation of performance using loss metrics or other single-dimensional evaluations. For example, loss between two endpoints in a network may be estimated based on measured or calculated/estimated loss at each hub of the network. However, while such estimations may be useful for targeting a specified dimension of performance, the approaches may provide an incomplete picture of overall availability of a network or network region/device.

The present disclosure describes technologies, for example in the context of large, complex networks such as cloud networks, that consider multiple facets of connectivity and acceptable performance to estimate availability of a network. As noted above, there are many different measures of performance and connectivity. Some measures may be defined on a per-device basis, while others may be defined across an end-to-end communication path (e.g., between two nodes forming end points of the path) through the network, etc. In order to provide an expansive view of these measures, multiple data sources may be combined intelligently to evaluate overall availability in a more reliable manner than other approaches that target fewer measures (e.g., approaches that focus only on performance or only on one aspect of performance, etc.). The technologies of the present disclosure may combine the multiple data sources to determine connectivity status at a per-device or per-region level (e.g., using routeability, reachability, and/or other measures of connectivity), as well as to determine performance metrics relative to associated performance thresholds, targets, or other conditions. The multiple data sources may perform different types of monitoring, including passive monitoring (e.g., reported measurements from a network device such as a router/firewall) and/or active monitoring (e.g., results of sending probe packets/pings through the network). These and other features of the disclosed technologies are described in more detail below and with respect to the accompanying figures.

Figure 1:
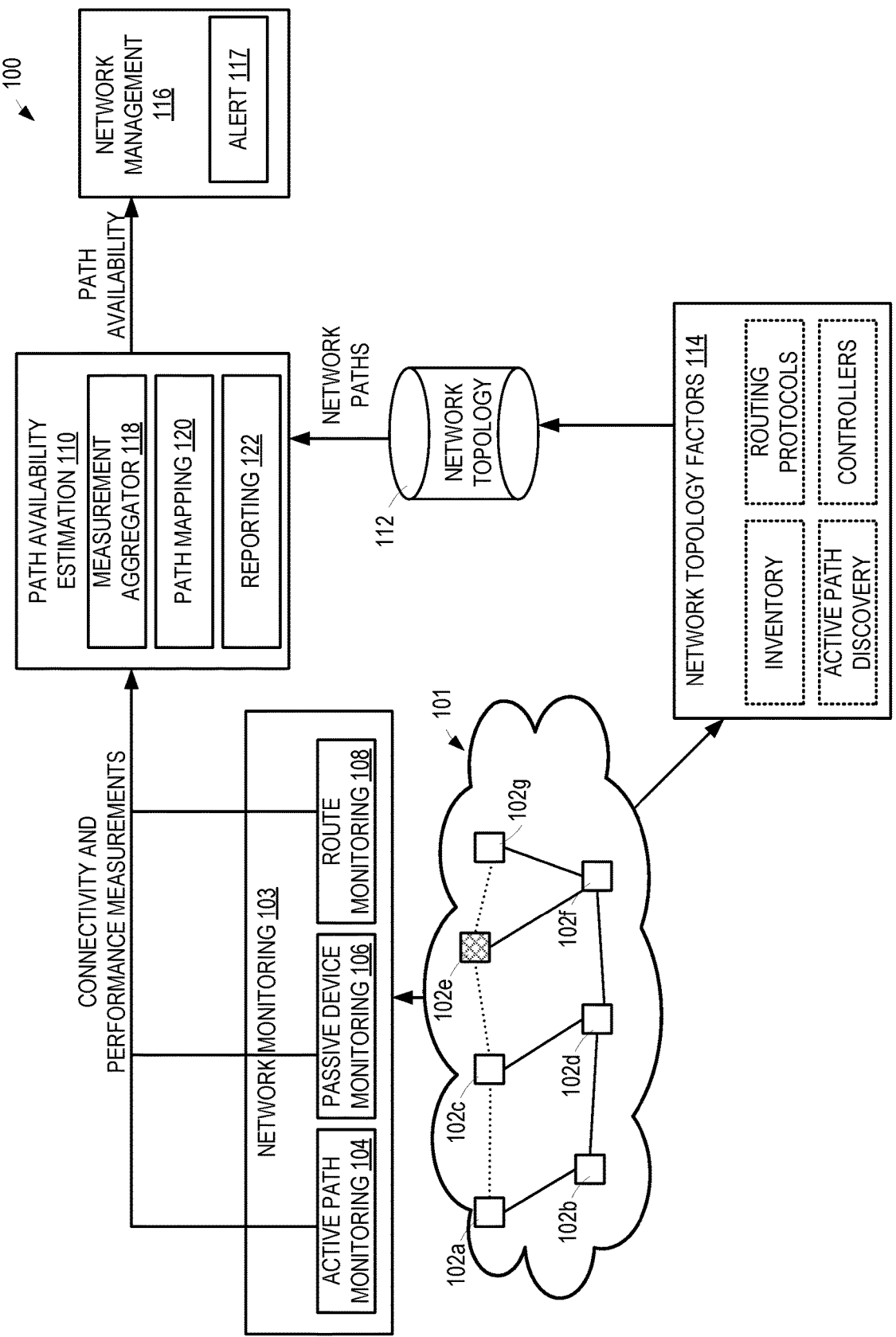
FIG. 1 schematically depicts an example environment for combining multiple network monitoring data sources to estimate path availability within the network.

FIG. 1 illustrates an exemplary system 100 for estimating path availability in a computer network 101. In the illustrated example, the computer network 101 includes seven network devices 102a-102g that provide different physical interface combinations for sending packets through the network. The computer network can be a geographically distributed collection of nodes (e.g., network devices 102) interconnected by communication links and segments for transporting data between end nodes or endpoints, such as personal computers, servers, and workstations, connections to an external network (e.g., via border nodes), or other devices, such as sensors, etc. Each network device may include, for example, a network router or switch. Alternatively, each network device 102 can represent an interface of a network device, a container, and/or other hierarchical tier that aggregates interfaces of network devices. As used herein, interfaces refer to ports of the network device that provide connectivity to other devices of the network. As such, each network device may have multiple interfaces, for example, input ports and output ports. It is to be understood that the number of devices shown in FIG. 1 is provided as an illustrative example, and the disclosed approaches may be applied to networks having any number or combination of network devices.

The network 101 illustrated in FIG. 1 can be any type of network, such as a local area network (LAN) or a wide area network (WAN). LANs typically connect nodes over dedicated private communication links located in the same general physical location, such as a building or campus. WANs typically connect geographically dispersed nodes over long-distance communication links, such common carrier telephone lines, optical light paths, Synchronous Optical Networks (SONET), Synchronous Digital Hierarchy (SDH) links, or Power Line Communications (PLC), and so forth. Various network architectures, such as Clos networks, can be used. For example, network 101 may constitute a LAN while an external network connected thereto may constitutes a WAN or an intervening network that connects network 101 to the Internet.

Continuing with the illustrated example of FIG. 1, a plurality of network monitoring systems and/or data sources (shown collectively as network monitoring 103) may be used to estimate path availability according to one or more of the methods described herein. For example, in order to compute path availability for different paths of the network 101, different measures of device/path/region connectivity and/or performance may be computed and compared against respective associated thresholds (e.g., defined by a service level agreement (SLA) and/or corresponding to categories of measurements) to determine a percentage of compliance for the cardinality of combinations. For example, different types of measurements may have different thresholds defining levels of the type of measurement that correspond to acceptable availability, connectivity, performance level, and/or other metric for a respective category of connectivity and performance data (e.g., loss measurements may be compared to a loss threshold, packet refusal rates may be compared to a packet refusal threshold, etc.). Computing the measures may include monitoring the network both actively (e.g., via active path monitoring service 104, which may indicate path health) and passively (e.g., via passive device monitoring service 106, which may indicate device data plane health), as well as performing route monitoring operations (e.g., via route monitoring service 108, which may indicate device control plane health), then combining the associated measurements using a measurement aggregator 118 of a path availability estimation service 110, as will be described in more detail below. For example, the network issue with network device 102e, represented by the illustrated shading, may cause up/downstream issues along the dashed links (e.g., between device 102e and 102g, between device 102e and 102c, and between device 102c and 102a). If viewed from a purely passive perspective based on passive device monitoring 106, the network device 102e may report issues that identify the reduced connectivity/performance on the links connected to device 102e, but may not identify the propagation of the issue to the link between device 102c and 102a. Likewise, active device monitoring may identify issues along some of the links, but may not pinpoint a device involved in the reduced performance/connectivity. Combining the measurement data from the different network monitoring data sources 103 (e.g., including data sources comprising monitoring devices that are located within a targeted path and/or data sources comprising external monitoring devices located outside of the targeted path) with the topology information from network topology database 112 enables a more accurate view of the overall availability of a targeted path or the network as a whole.

The path availability estimation service 110 may be implemented via a distributed computing system and/or one or more dedicated computing systems (e.g., as instances running on servers in a cloud compute service). In some examples, the components included in the path availability estimation service 110 may be implemented as a pipeline of connected distributed and/or singular computing systems. For example, one or more distributed or singular computing systems may store instructions executable by one or more processing components to perform operations contributing to the path availability estimation, such as the aggregation of measurements, mapping of measurements to paths, determination of availability estimates, and/or reporting of availability estimates.

As further illustrated in FIG. 1, the path availability estimation service 110 may receive physical topology information such as network path information from a network topology database 112 and/or other data sources. For example, the network topology database 112 may be populated using network topology factors 114 for the network 101 such as inventory information for devices in the network (e.g., intended links and nodes in the network), indications of routing protocols or forwarding logic used by devices of the network (e.g., indicating observed links and nodes), outputs of active path discovery operations performed in the network (e.g., a route-tracing function, such as traceroutes or tracert, may be employed for a particular source-destination or sender-recipient pair to observe paths), information from and/or regarding controllers in the network (e.g., indicating intended paths through the network), etc. The network topology factors 114 may be aggregated and processed to determine network paths and associated information for the network paths (e.g., using path mapping engine 120). The path availability estimation service 110 (e.g., the measurement aggregator 118) may combine the measurement data from the multiple data sources for network monitoring 103 along a targeted communication path, based on the network path information from the network topology database 112, to derive a path availability estimation for the targeted communication path. More detailed examples of such aggregation are described in more detail below, for example with respect to FIGS. 5 and 6.

The path availability estimation may be output, via a reporting engine 122, to a network management service 116 (e.g., a management/administrator computing device) configured to perform an action, such as reporting the path availability (e.g., via a user interface, such as a graphical user interface) to a client or manager of the network 101 and/or performing adjustments to the network 101 based on the path availability estimation (e.g., adjusting traffic routing, operating thresholds, etc. in the network). For example, the path availability reporting may enable a management entity to view statistical information relating to the operation of the network and identify issues in the network. In some examples an alert 117 may be generated based on the determined path availability estimate to inform a user/administrator of a potential path availability issue in the network. Additionally or alternatively, the path availability reporting may be used by the network management service 116 for performing an automated adjustment of operation of the network in response to calculated availability (or lack of availability) in the network. For example, if the calculations from the path availability estimation service 110 indicate that a targeted path and/or device does not meet an availability threshold, routing control via the network management service 116 may cause future traffic to selectively avoid the network device and/or path, and/or may adjust and/or control traffic flow to decrease flow through the network device and/or path in an attempt to increase overall throughput and availability of the network.

Figure 2:
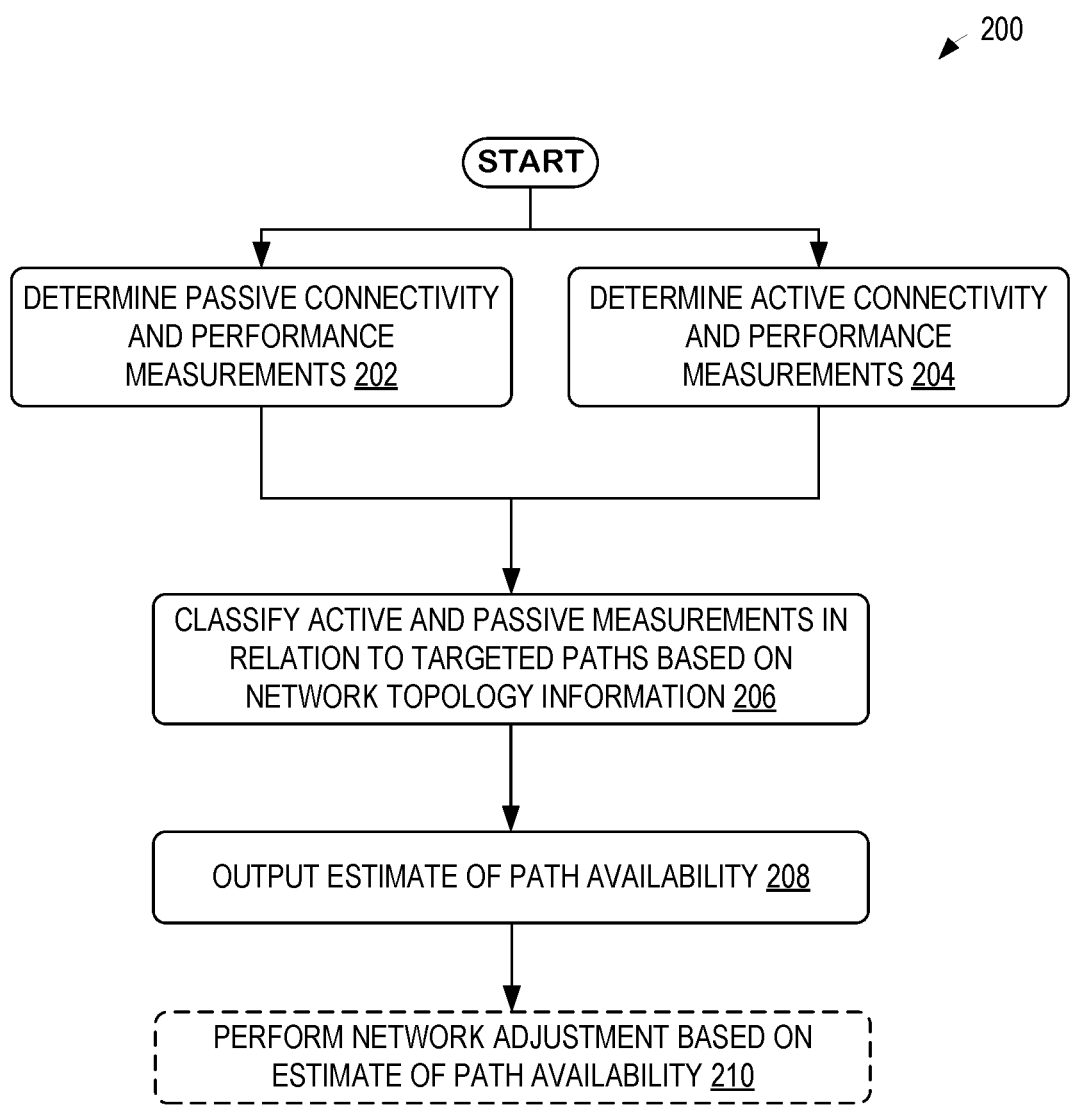
FIG. 2 is an example method for combining multiple network monitoring data sources to estimate path availability within the network.

FIG. 2 is a flow chart of an example method 200 for estimating path availability in a network. In some examples, method 200 may be performed by a computing system included in and/or communicatively coupled to a monitored network. For example, method 200 may be performed by one or more computing systems operating as one or more of the components 103, 104, 106, 108, 110, and/or 116 to estimate path availability in network 101 of FIG. 1. At 202, the method includes determining passive connectivity and performance measurements, which may include measurements relating to a targeted path in the network. The passive path connectivity and performance measurements may be determined based on information reported from devices in the network indicating performance- and/or connectivity-related measures corresponding to the targeted path.

At 204, the method includes determining active connectivity and performance measurements, which may include measurements relating to the targeted path of the network. For example, the active connectivity and performance measurements may be determined based on actively-controlled probe packets, pings, or other messages sent through the network. As shown, the active and passive measurements may be acquired in parallel, asynchronously, and/or otherwise independently from one another.

At 206, the method includes classifying the passive connectivity and performance measurements and the active connectivity and performance measurements in relation to targeted paths in the network based on network topology information. In this way, path availability may be based on a constituent metric, such as one or more of the active/passive measurements with the context of path information gleaned from network topology information. For example, the passive connectivity and performance measurements may provide performance and/or connectivity information from a per-network-device perspective, which may be contextualized in terms of a targeted path based on the network topology information (e.g., the network topology information may indicate paths that include the network device associated with the passive measurement and attribute the measurement to those paths). As another example, active connectivity and performance measurements may provide performance and/or connectivity information for different levels of granularity, such as a broad source-destination context or a path including specified hops between source and destination. The active measurement may be associated with a targeted path based on link overlap determined for the active measurement and the targeted path using the network topology information (e.g., the active measurement may be associated with a targeted path if the measurement is designated for a path that includes the same source, destination, threshold number of hops/links, etc. as a targeted path). As noted above, the active and passive measurements may be acquired independently of one another. Accordingly, in some examples, classification may be performed for active and passive measurements independently, then optionally combined based on overlapping features (e.g., link/hop overlap) to provide additional context for the measurements.

Furthermore, the classification may take into account other passive/active measurements. As a non-limiting illustrative example, performance or connectivity issues indicated by a passive measurement may be determined to correspond to availability issues for a path if the issues are confirmed by active measurements corresponding to the path (e.g., if the path passes through the device providing the passive measurement, the issues indicated by the passive measurement may be confirmed if experienced elsewhere on the path).

At 208, the method includes outputting an estimate of path availability. For example, the estimate of path availability may be determined by comparing the classified measurements to respective conditions, such as thresholds (e.g., thresholds corresponding to categories of the measurements), and aggregating the results of the comparison. The output of the estimate of path availability may be provided to a user interface for alerting a client and/or management entity of the estimated path availability. In other examples, the output may be provided to a management entity for controlling automatic adjustment of the network, as described in more detail below. In some examples, the output may include an indication of the path experiencing below a threshold level of availability, an estimated cause of the level of availability, and/or other information relating to the estimated availability of the targeted path.

As indicated at 210, the method optionally further includes performing a network adjustment based on the estimate of path availability output at 208. For example, traffic routing through the network and/or traffic balancing in the network may be adjusted based on the path availability output.

Figure 3:
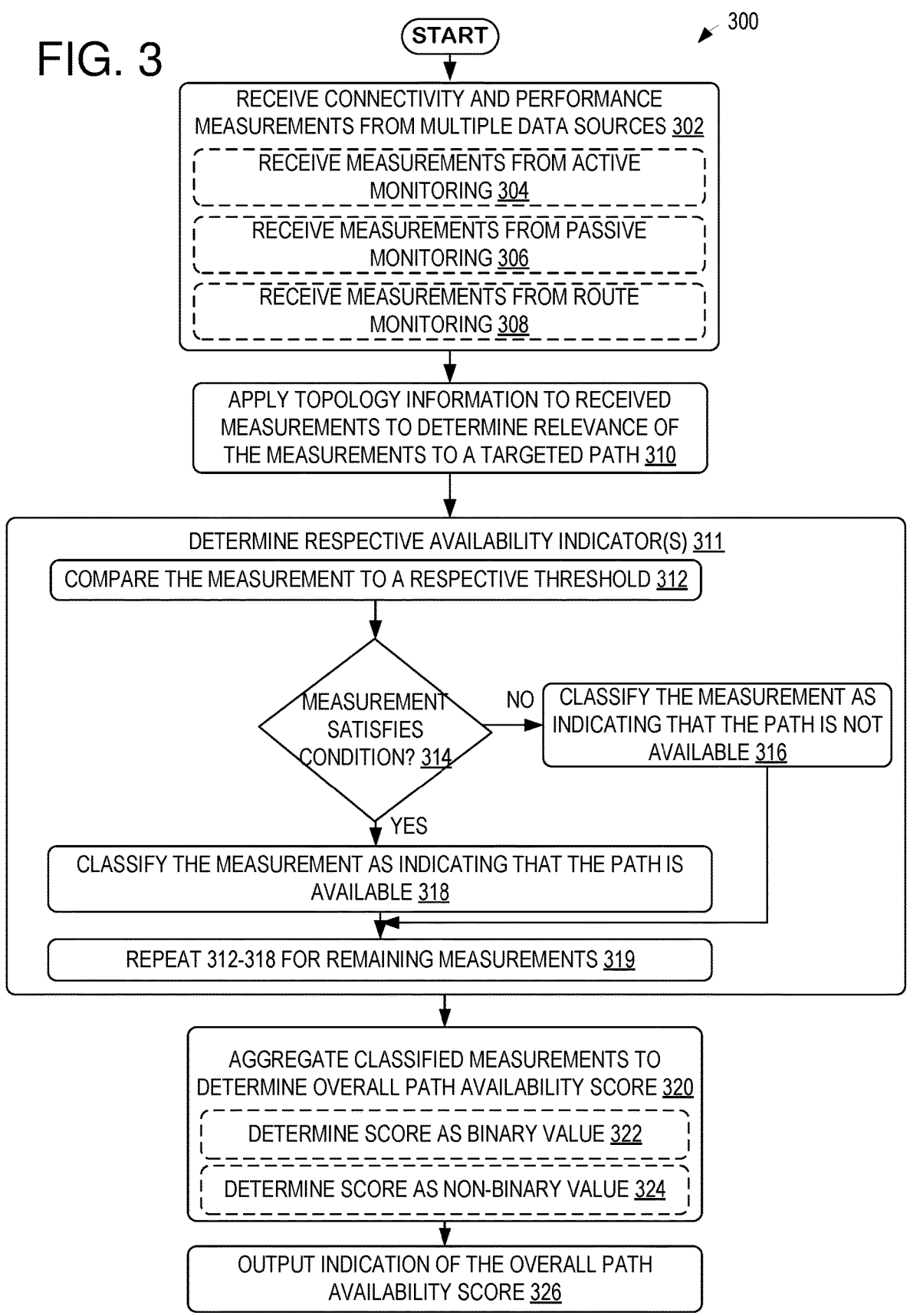
FIG. 3 is another example method for combining multiple network monitoring data sources to estimate path availability within the network.

FIG. 3 is a flow chart of an example method 300 for estimating path availability in a network. In some examples, method 300 may be performed by a computing system included in and/or communicatively coupled to a monitored network. For example, method 300 may be performed by one or more computing systems operating as one or more of the components 103, 104, 106, 108, 110, and/or 116 to estimate path availability in network 101 of FIG. 1. At 302, the method includes receiving connectivity and performance measurements from multiple data sources. For example, the multiple data sources may include active monitoring data sources (e.g., active path monitoring 104 of FIG. 1) as indicated at 304, passive monitoring data sources (e.g., passive path monitoring 106 of FIG. 1) as indicated at 306, route monitoring sources (e.g., route monitoring 108 of FIG. 1) as indicated at 308, and/or other data sources configured to provide measures relating to connectivity and/or performance (e.g., jitter, throughput, latency, loss, connection refusals, accessibility/reachability, etc.).

At 310, the method includes applying topology information to the received measurements to determine relevance of the measurements to a targeted path. Applying the topology information may include mapping each measurement to one or more targeted paths associated with the measurement. For example, performance measurements relating to an active measurement of an end-to-end path may be considered to be relevant to all devices/links included in the end-to-end path, and the active measurement may be considered to be relevant to the targeted path if any devices/links of the end-to-end path are also included in the targeted path. Similarly, measurements from different data sources may be combined with one another and the topology information to provide a greater context of the measurement. As an illustrative example, latency detected on an end-to-end path from a device A to a device B may be attributed to an issue at device A or a link between device A and device B if no other paths involving device B experience such latency.

At 311, the method includes determining respective availability indicators for the measurements received at 302 and mapped to paths at 310. The determination may include multiple operations (e.g., 312-318) that are performed for each measurement. At 312, the method includes, for at least one of the measurements, comparing the measurement to a respective threshold or other conditional metric. For example, the at least one of the measurements may include one or more of the measurements determined to be relevant to the targeted path at 310. The comparison may include a comparison of the measurement to an associated threshold (e.g., defined by a service level agreement (SLA) or other standard) or other condition that indicates that performance or accessibility/connectivity is below an acceptable level.

At 314, the method includes determining whether the measurement(s) satisfy a condition. The condition may include an adaptive threshold (e.g., a threshold that changes based on network status/traffic levels, client, time of day, etc.), a static threshold (e.g., a threshold that is maintained for different contexts/conditions), a service objective (e.g., a previously-identified SLA), and/or another condition usable to estimate whether the measurement indicates availability or unavailability for a given device/link/path/etc. For examples where the condition is a threshold, satisfying the condition may include determining that the measurement is greater than or at least a minimum threshold, less than or at most a maximum threshold, etc., and/or for examples where the condition is a service objective, satisfying the condition may include determining that the measurement adheres to the service objective. For each measurement analyzed at 312 that does not satisfy the threshold condition (e.g., "NO" at 314), the method includes classifying that measurement as indicating that the path is not available (e.g., indicating an unavailable path; as used herein, "not available" may also be referred to as "unavailable"), as indicated at 316. In some examples, this indication may include associating an availability score based on a distance from the threshold and/or other factors (e.g., a weight of the measurement indicating an importance or contribution of the measurement to availability, etc.). For each measurement analyzed at 312 that does satisfy the threshold condition (e.g., "YES" at 314), the method includes classifying that measurement as indicating that the path is available (e.g., indicating an available path), as indicated at 318. In some examples, this indication may include associating an availability score based on a closeness to the threshold and/or other factors (e.g., a similar weighting as described above may be applied to these measurements as well). At 319, the method includes repeating operations 312-318 for any remaining measurements. It is to be understood that the operations 312-318 may be performed on an ad hoc or periodic basis as measurements are received and mapped to paths.

At 320, the method includes aggregating the classified measurements to determine an overall path availability score. As indicated at 322, in some examples, the overall path availability score may be a binary value (e.g., "available" or "not available"/"unavailable"). For example, the classifications at 316 and 318 may include classifying each measurement analyzed at 312 to indicate that the path is available or not available, and if any one measurement (or if a threshold number of measurements) indicates that the path is not available, the overall path availability score may be determined to be the binary value associated with "not available" or "unavailable." In this way, as described in more detail below with respect to FIG. 5, the score determination may utilize a logical "AND" operation or other Boolean logic (e.g., one or more additional or alternative logical Boolean operations) to determine the binary value. As indicated at 324, in additional or alternative examples, the overall path availability score may be determined as a non-binary value, such as an estimated percentage or likelihood of availability, or a ranking of availability on a scale. Examples of the non-binary value calculations are described below with respect to FIG. 6.

At 326, the method includes outputting an indication of the overall path availability score. For example, the generated output may be used for alerting/notifying users and/or administrators of path availability via transmission of associated information/control instructions to targeted systems. For example, the targeted systems may include a graphical user interface for presenting one or more graphical representations of the overall path availability score (and/or related information, such as the path associated with the score, measurements/associated data sources that contributed to the score, etc.) and/or for alerting a user/administrator of path availability, which may prompt the user/administrator to adjust the network and/or network operations. In other examples, the generated output may be used for automatically controlling a targeted system (e.g., a system providing a user interface for a user/administrator/network manager/etc., a system configured to control the network and/or network operations, etc.) for network control or network operational changes. For example, the output may be configured to control the targeted system to perform an action relating to an estimation of a percentage of users and/or network communication sessions experiencing issues with communicating on the targeted path (e.g., based on the generated overall path availability score). Examples of actions and/or adjustments to the network are described above and include, but are not limited to, changing a topology of the network, changing routing and/or traffic flow through the network, adjusting SLAs for new and/or existing users of the network, etc.

Although described with respect to a targeted path, it is to be understood that the method 300 may be performed for multiple iterations (e.g., sequentially and/or in parallel) to determine availability of multiple targeted paths in the network (e.g., all paths in the network, paths through a selected region of the network, etc.). In some examples, the path availability scores for multiple paths may be aggregated in a similar manner to the methodology described above at 320 to determine an overall availability for a region of the network (e.g., that includes the multiple paths) and/or the network as a whole. In some examples, method 300 may be triggered to be performed for a targeted path based on reports and/or other data indicating a potential connectivity or performance issue in a region of the network that includes the targeted path. In other examples, method 300 may be performed regularly/at regular intervals to provide ongoing monitoring of availability in the network.

Figure 4:
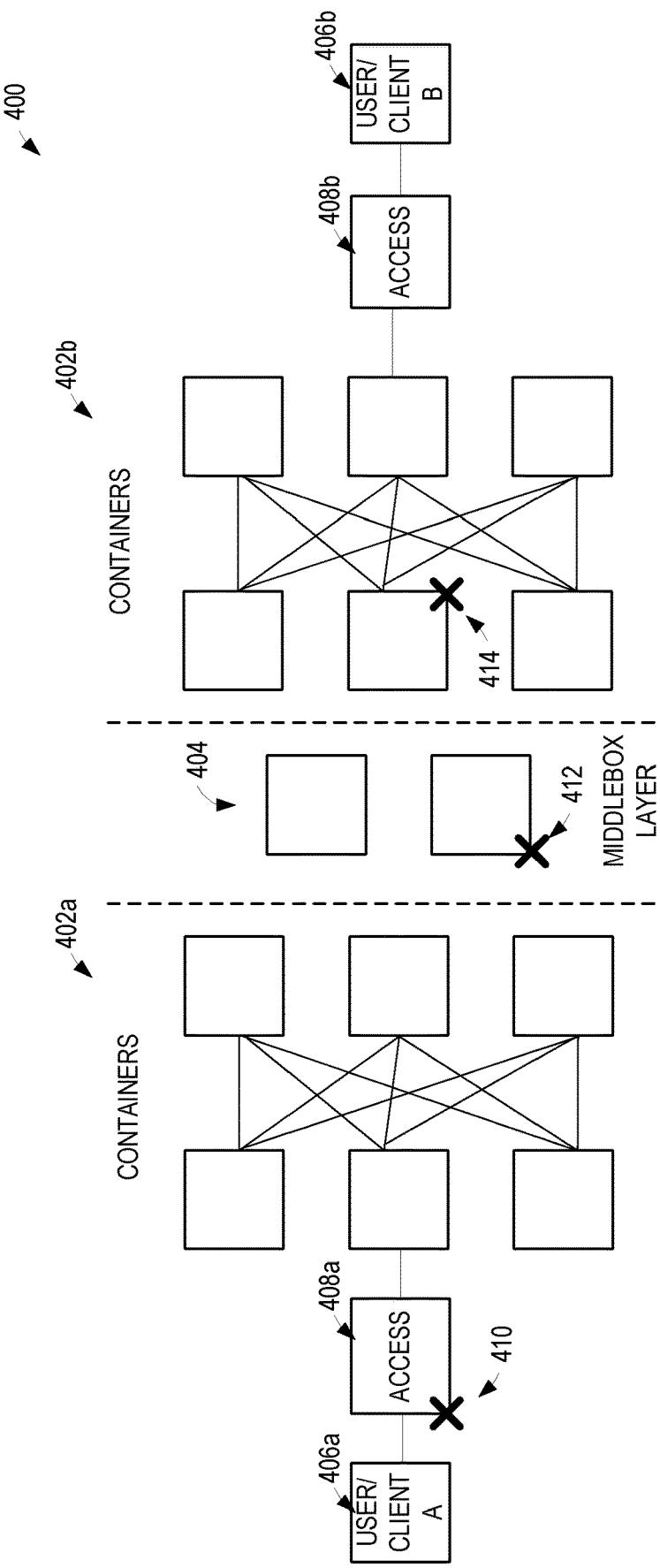
FIG. 4 schematically depicts example scenarios of path availability disruptions in a network, which may be identified using a path availability estimation operation in accordance with one or more examples of the present disclosure.

FIG. 4 schematically depicts example sources of path availability issues in a network, which may be determined using the methods and systems for path availability estimation described herein. For example, the path availability estimation 110 of FIG. 1 may be used to determine the various sources of path availability issues and resulting effect on path availability using one or more of the operations of methods 200 and/or 300 of FIGS. 2 and 3. In FIG. 4, a network 400 includes a plurality of containers 402a and 402b that are connected to one another via a middlebox layer 404. Users 406a and 406b may connect to a respective group of containers (e.g., user 406a connects to containers 402a and user 406b connects to containers 402b) via a respective access 408a and 408b. The containers 402a/b, accesses 408a/b, and devices of middlebox layer 404 may include network devices such as routers, servers, etc. that are configured to receive data and forward the data along a path to a targeted destination based on links between the network devices and associated traffic/routing protocols.

As indicated by the "X" marks in FIG. 4, accessibility to the network 400 may be compromised at various points in the network, each of which may be detectable by the path availability estimation systems and methods described herein. For example, a first example of accessibility loss may occur at access 408a, as shown at 410. In this example, the user 406a may not be able to access the network due to a refusal of traffic by the access 408*a*, which may be detected based on active or passive measurements, or a querying of routing controls for the access 408*a*.

In another example, middlebox connectivity loss may occur as indicated at 412. For example, traffic entering one or more of the devices of the middlebox layer 404 may be refused/dropped or may not be routed to further destinations. In yet another example, a container may be experiencing prefix routing issues, leading to a container-based loss of availability, as indicated at 414. For example, traffic routed to a container of containers 402*b* may be refused/dropped or may not be routed to further destinations due to prefix routing errors of the container. In each of these examples, the disclosed technologies may not only detect the overall path or network availability resulting from these issues; the disclosed technologies may also determine the root cause of the overall path or network availability (e.g., identify whether the availability of a path is determined to be low or not available due to the issue at 410, 412, 414, or some other issue). By leveraging information from multiple data sources and combining this information with a network topology as described herein, a more precise identification of device(s) involved in path availability issues and associated connectivity or performance issues may be performed. For example, one measurement from one data source may by used to identify one of the illustrated types of faults/issues, in some cases to a broad degree of granularity (e.g., one of the issues may be characterized as generally an issue between client A and client B). By merging the inputs of multiple measurements from multiple data sources, each of the illustrated faults/issues may be identified to a more precise degree of granularity, as measurements may be aggregated as described herein to identify where along a path the issue arises.

Figure 5:
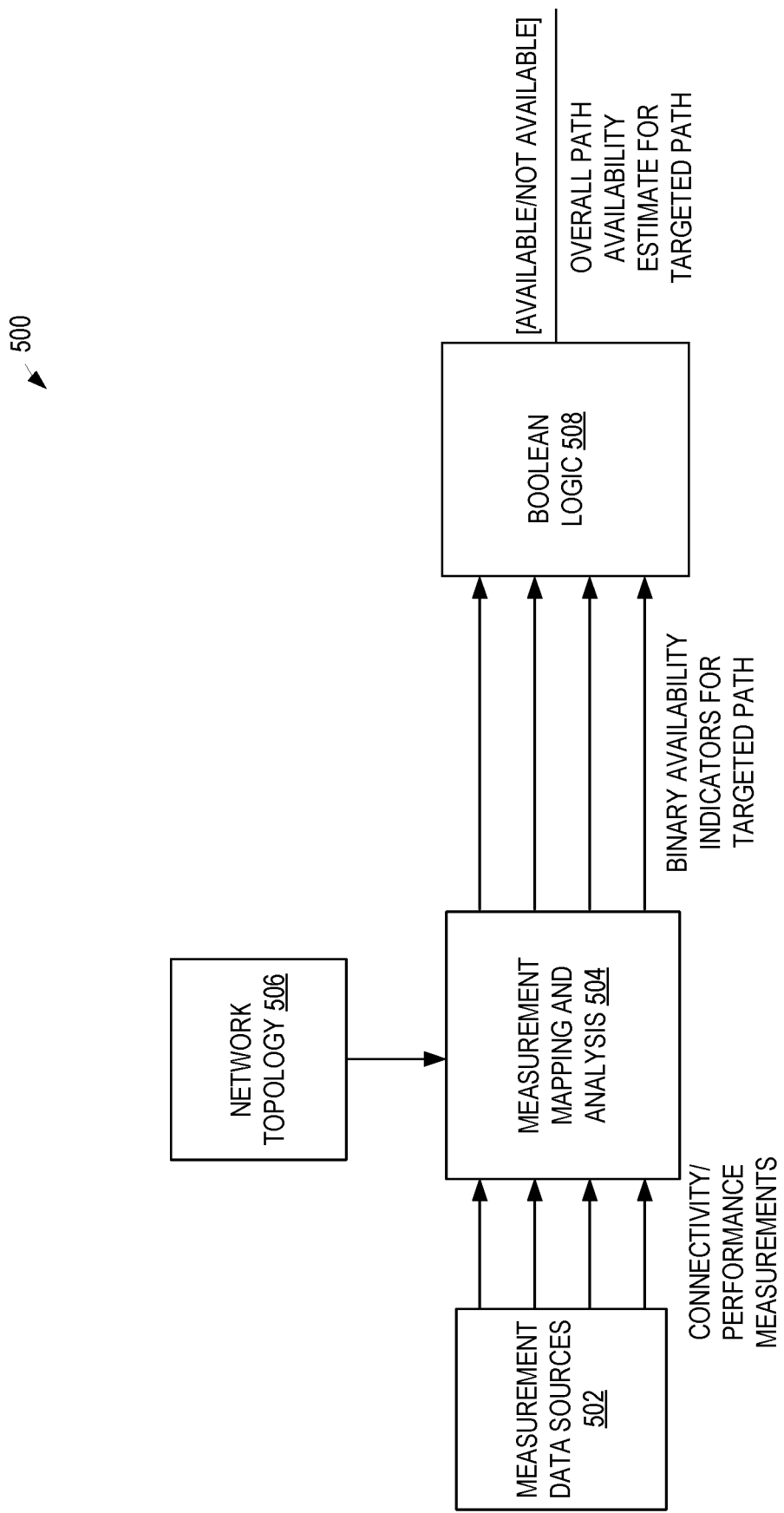
FIG. 5 schematically shows a first example algorithm for combining connectivity and performance measurements from multiple data sources to determine a binary overall path availability score.
Figure 6:
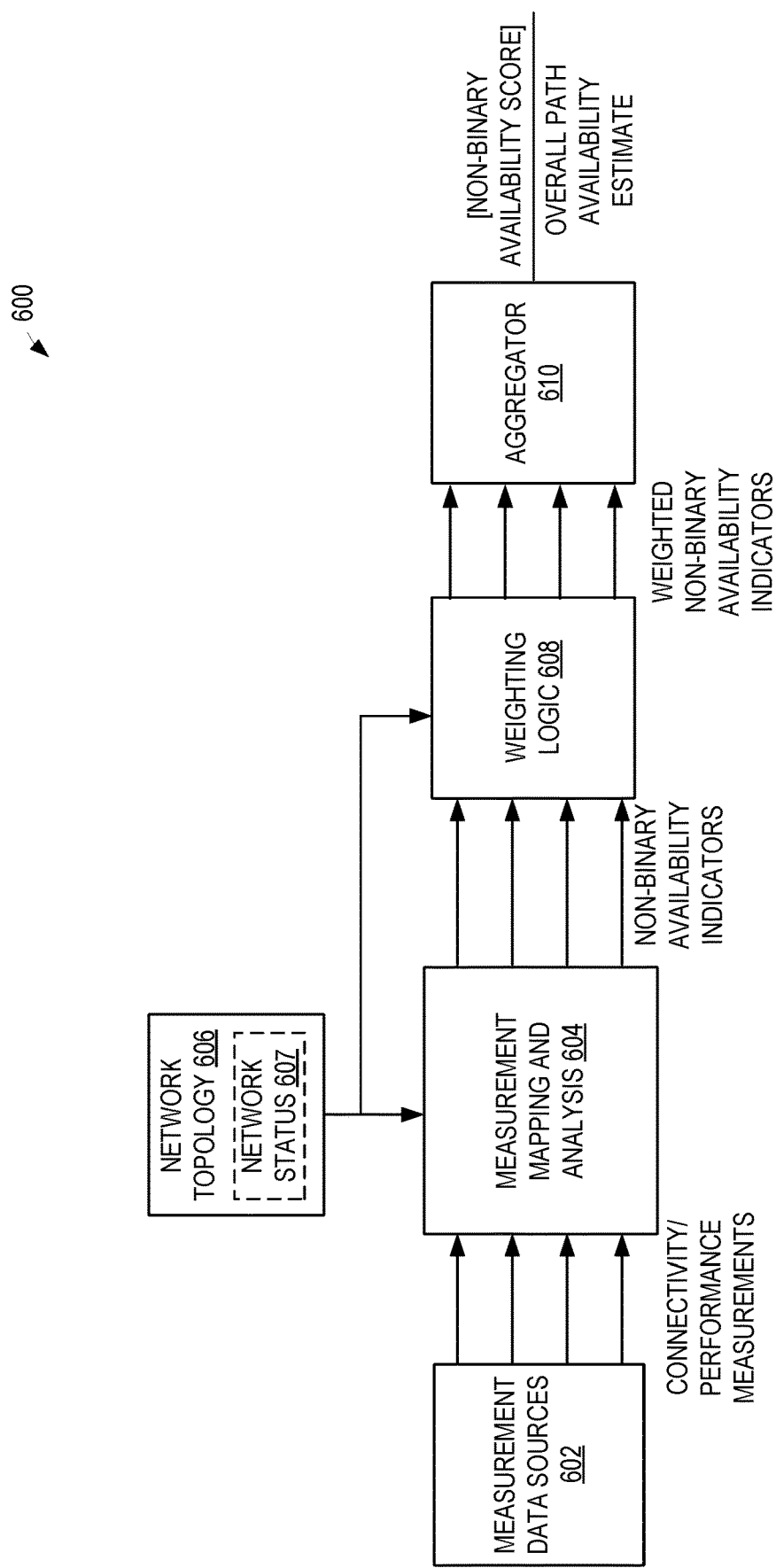
FIG. 6 schematically shows a second example algorithm for combining connectivity and performance measurements from multiple data sources to determine a non-binary overall path availability score.

FIGS. 5 and 6 schematically show example algorithms or methods for combining measurement data to determine overall path availability estimates or scores. As shown, the method 500 of FIG. 5 is used to produce a binary indication of overall path availability, while the method 600 of FIG. 6 is used to produce a non-binary score of overall path availability. As described in more detail below, it is to be understood that in some examples, features from the method 500 may be used in combination with features from the method 600 (or vice versa) to generate an overall path availability estimation.

Turning first to FIG. 5, the method includes providing connectivity and/or performance measurements from measurement data sources 502 to a measurement mapping and analysis unit 504. The measurement mapping and analysis unit 504 may also receive network topology information from a network topology data source(s) 506 to determine, for each received measurement, paths with which the measurement is associated and whether the measurement indicates that a targeted path is available or not available. For example, the measurement mapping and analysis unit 504 may perform operations such as those described above at 310-319 of FIG. 3 and/or other operations to map the measurements to paths (e.g., using the data from network topology data source(s) 506) and determine binary availability indicators for the targeted path. In some examples, the measurement mapping and analysis unit 504 may map measurements to paths at different hierarchical levels. For example, device-level measurements may be mapped or attributed to a path that includes the device relating to the measurement, path-based measurements for measured paths may be mapped or attributed to paths that have at least some link overlap with the measured path, and source/destination measurements (e.g., measurements relating to data traversing from a source to a destination, for example accounting for multiple paths between the source and destination or otherwise not specified as relating to an identified singular path between the source and destination) may be mapped or attributed to paths that can be traversed when travelling between the source and destination.

As an illustrative, non-limiting example, a first path may traverse devices A, B, and C, and a second path may traverse devices D, B, and C. In the example, a measurement for device B that indicates that the device is unavailable (e.g., based on a comparison to a condition, as described with respect to FIG. 3) may be used to initially generate an "unavailable" indicator for any path that includes/passes through device B when analyzed on its own. As more measurements are received/analyzed, the measurement for device B may be combined (e.g., in the measurement mapping an analysis unit 504) with a path-based measurement that indicates that the path A, B, C is "available" to determine that path A, B, C is "available," but all other paths upstream of device B are unavailable. As even more measurements are analyzed, more precise/accurate indicators may be generated. For example, if another path-based measurement for path D, B, C indicates that the path is "unavailable" and a device-level measurement for device D indicates that the device is "unavailable," then the availability for paths that are upstream of device B but do not pass through device D may be estimated to be available (absent other information to the contrary), as device D may be attributed as causing the occasional issues of availability/connectivity to downstream device B. It is to be understood that other examples of combining measurements from different sources/different levels of hierarchy (e.g., device-based, path-based, source/destination-based, etc.) may be performed to provide the binary availability indicators for a targeted path.

Each of these binary availability indicators are provided to a Boolean logic engine 508 (e.g., an AND logic engine, configured to process instructions in a computing device implementing an AND logic function), and an output of the Boolean logic engine 508 is a binary indication of overall path availability (e.g., an "available" or "not available"/ "unavailable" indication). Accordingly, in some examples, if any one of the binary availability indicators for a targeted path indicates that the path is not available, the overall path availability is determined to be "not available" or "unavailable," whereas if all of the binary availability indicators for the targeted path indicate that the path is available, the overall path availability is determined to be "available." In other examples, other types of logic may be applied to the input availability indicators; for example, if a threshold number of the path availability indicators indicate that the path is "available," then the overall path availability score may be determined to be a value corresponding to an "available" path, whereas if fewer than the threshold number of the path availability indicators indicate that the path is "available" (or a threshold number of the path availability indicators indicate that the path is "unavailable"), the overall path availability score may be determined to be a value corresponding to an "unavailable" path. It is to be understood that the operations in FIG. 5 relate to generating an estimate of overall path availability for a targeted path, however, the same or similar components may be used iteratively (and/or in parallel) to estimate path availability for multiple targeted paths (e.g., the binary availability indicators output by the measurement mapping and analysis unit 504 may be tagged with paths to which they relate, and the Boolean logic engine 508 may combine indicators on a per-path basis to generate respective targeted path availability estimates). In other examples, the availability indicators output by the measurement mapping and analysis unit 504 and the availability estimates output by the Boolean logic engine 508 may be provided at a different hierarchical level, such as a device availability estimate or end-to-end source to destination availability estimate.

FIG. 6 shows a different approach to generating a path availability estimate. Similarly to method 500 of FIG. 5, the method 600 of FIG. 6 includes providing connectivity and/or performance measurements from measurement data sources 602 to a measurement mapping and analysis unit 604, and the measurement mapping and analysis unit 604 also receives network topology information from a network topology data source(s) 606. However, in method 600, the measurement mapping and analysis unit 604 is configured to determine, for each received measurement, a non-binary availability indicator, such as an availability score associated with the measurement. The determination of the availability indicator may be performed in a similar manner as described above for measurement mapping and analysis unit 504 of FIG. 5, and may yield a non-binary score rather than a binary value representing "available" or "unavailable." For example, the non-binary availability indicator may include a value corresponding to a difference between the measurement and the respective threshold. As a non-limiting illustrative example, measurements that are 5% below a minimum threshold may be associated with an indicator that corresponds to a lower level of unavailability (e.g., slightly unavailable) than measurements that are 50% below a minimum threshold, which may be associated with an indicator that corresponds to a relatively higher level of unavailability (e.g., very unavailable). The non-binary availability indicators are provided to weighting logic 608, which applies weights to the indicators based on a relevance or importance of the associated measurement to path availability. As an illustrative example, for some applications or clients, latency may be of lower importance than loss, in which case measurements indicating low availability based on latency may be weighted less than measurements indicating low availability based on loss. In some examples, the weighting logic 608 may receive data from the network topology data sources 606, which may further include network status information 607 (additionally or alternatively, in some examples, the network status information 607 may be retrieved from one or more additional data sources other than those providing the topology information) to determine/apply weights to the availability indicators. For example, weights may be applied based on utilization or other network status information (e.g., weighting for a measurement may increase with increasing utilization of paths/devices/links associated with the measurement such that measurements associated with more heavily-utilized paths/devices/links are weighted more than other measurements for less heavily-utilized paths/devices/links).

Aggregator 610 may receive the weighted non-binary availability indicators from weighting logic 608 and combine the weighted indicators to determine an overall path availability score (e.g., a non-binary score, such as a percentage or level/ranking of path availability). In one example, the aggregator 610 may average the weighted non-binary availability indicators and/or convert the average/aggregated indicators to a standardized scale to determine the score. The weights may be applied to adjust the contribution of each availability indicator (e.g., based on a type/category of connectivity or performance measure used to determine the availability indicator) to an overall path availability score. In some examples, the weighting logic 608 may be optional, and the aggregator 610 may aggregate the non-binary availability indicators generated from the measurement mapping and analysis unit 604 (e.g., without weights; where each indicator contributes equally to the score).

It is to be understood that in still other examples, the methods 500 and 600 may be combined to provide a hybrid approach. For example, the weights of method 600 (described in more detail above) may be used to adjust the Boolean operation of method 500 and/or a resulting overall path availability may be a binary result that is based on a threshold number of measurements or weighted measurements indicating availability of the path. For example, the output of the measurement mapping and analysis unit 604 may be binary availability indicators that are weighted using weighting logic 608, and the aggregator 610 may aggregate the weighted binary availability indicators to determine a percentage or level of availability (e.g., where the percentage or level of availability is higher when more heavily-weighted "available" indicators are provided than lower-weighted "not available"/"unavailable" indicators and/or according to another aggregation scheme). In another example, the output of the measurement mapping and analysis unit 604 may still be non-binary availability indicators, and the aggregator 610 may determine a non-binary availability estimate, then compare the estimate to a threshold to determine a binary availability score (e.g., where the path is indicated to be available if equal to or above the threshold or not available if below the threshold).

Figure 7:
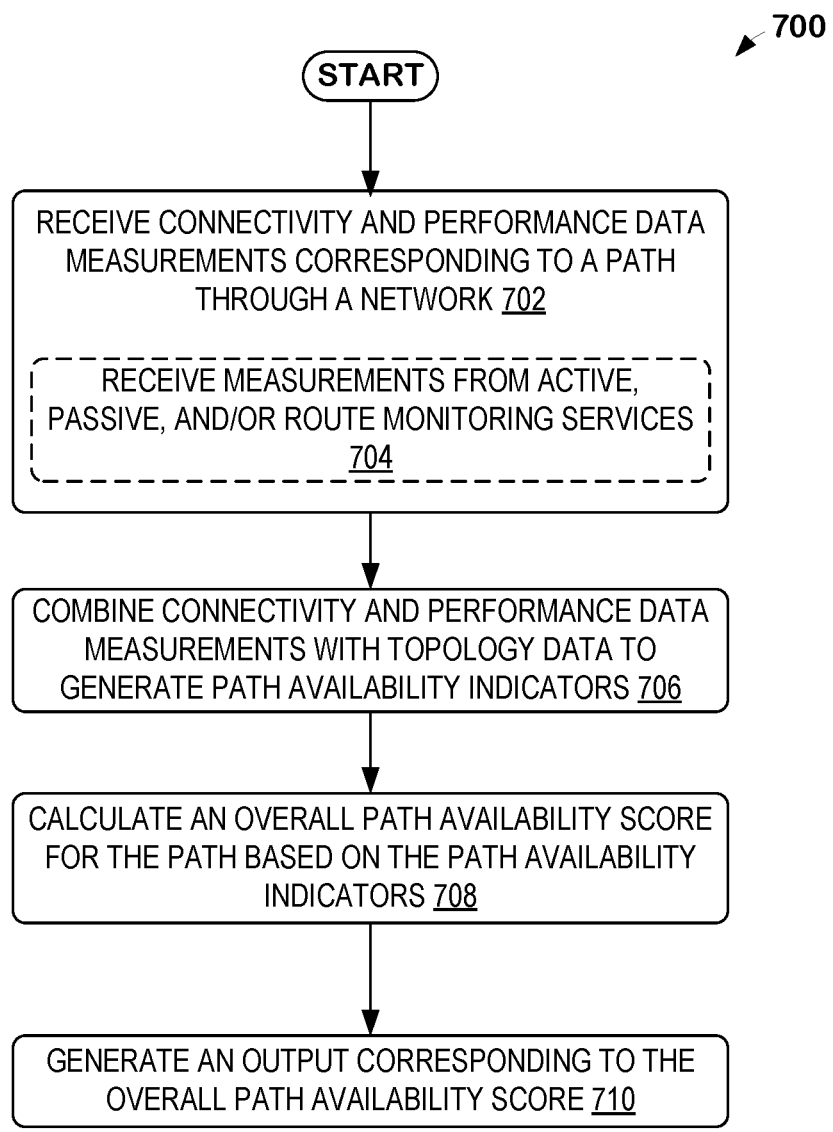
FIG. 7 is a flow chart of an example method for calculating an overall path availability score for a path through a network.

FIG. 7 is a flow chart of an example method 700 for calculating an overall path availability score for a path through a network. In some examples, method 700 may be performed by a computing system included in and/or communicatively coupled to a monitored network. For example, method 700 may be performed by one or more computing systems operating as one or more of the components 103, 104, 106, 108, 110, and/or 116 to estimate path availability in network 101 of FIG. 1. At 702, the method includes receiving (e.g., from a plurality of data sources) connectivity and performance data measurements corresponding to a communication path through a network. As indicated at 704, the plurality of data sources may include an active monitoring service, a passive monitoring service, and a route monitoring service.

At 706, the method includes combining the connectivity and performance data measurements with network topology data to generate path availability indicators corresponding to the connectivity and performance data measurements. For example, as described herein, network topology data may be used to provide a context of received measurements and to determine relevancy to a targeted path.

At 708, the method includes calculating an overall path availability score for the communication path based on the path availability indicators. Example methods of using path availability indicators are described herein, including the method described above with respect to FIGS. 5 and 6 (e.g., using a logical AND operation, weighting indicators and aggregating the weighted indicators, etc.). At 710, the method includes generating an output corresponding to the overall path availability score. For example, the output may be configured to control a targeted system to perform an action relating to a corresponding availability of the network based on the overall path availability score. The targeted system may include a traffic routing system, a network configuration system, a user interface for a management or administrative entity of the system, etc. In this way, the calculated overall path availability score may be used to adjust the network, for example to increase overall availability of the network, to adjust service level agreements, and/or to inform clients of network issues while the issues are being addressed.

Figure 8:
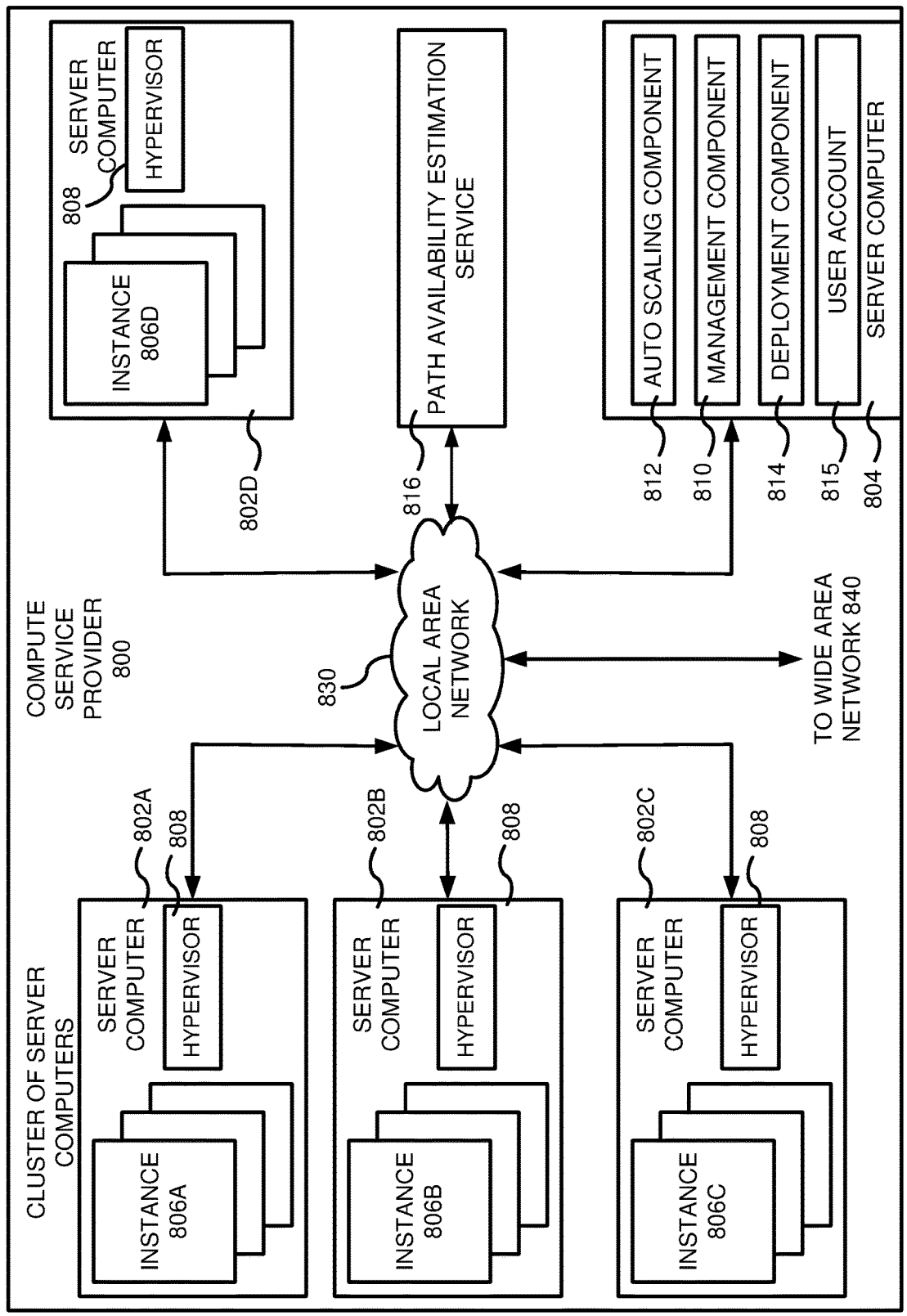
FIG. 8 is an example system diagram showing a plurality of virtual machine instances running in the multi-tenant environment.

FIG. 8 is a computing system diagram of a network-based compute service provider 800 that illustrates one environment in which embodiments described herein can be used. By way of background, the compute service provider 800 (i.e., the cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (i.e., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end customers access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

In some implementations of the disclosed technology, the computer service provider 800 can be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

With cloud computing, instead of buying, owning, and maintaining their own data centers and servers, organizations can acquire technology such as compute power, storage, databases, and other services on an as-needed basis. The cloud provider network can provide on-demand, scalable computing platforms to customers through a network, for example allowing customers to have at their disposal scalable "virtual computing devices" via their use of the compute servers and block store servers. These virtual computing devices have attributes of a personal computing device including hardware (various types of processors, local memory, random access memory ("RAM"), hard-disk and/ or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows customers to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the customer, the hardware associated with the virtual computing devices can be scaled up or down depending upon the resources the customer requires. Customers can choose to deploy their virtual computing systems to provide network-based services for their own use and/or for use by their customers or clients.

A cloud provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

The cloud provider network may implement various computing resources or services that implement the disclosed techniques for TLS session management, which may include an elastic compute cloud service (referred to in various implementations as an elastic compute service, a virtual machines service, a computing cloud service, a compute engine, or a cloud compute service), data processing service (s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by customers of the cloud provider network, which may be provisioned in customer accounts.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (i.e. a computer) that executes applications like a physical machine. In the example of virtual machine, each of the servers 802A-802D can be configured to execute a hypervisor 808 or another type of program configured to enable the execution of multiple instances 806 on a single server. Additionally, each of the instances 806 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc. Path availability estimation service 816 may include one or more components of the system 100 of FIG. 1 to estimate path availability in a network. For example, the path availability estimation service 816 may include the multiple data sources for performing network monitoring, as shown at 103 of FIG. 1, the path availability estimation service 110 of FIG. 1, etc. In some examples, the path availability estimation service 816 may be distributed among multiple servers or instances in the network, such as the servers 802A-D and/or associated instances 806A-D. In other examples, the path availability estimation service 816 may be at least partially included in the server computer 804 alongside other network management components. The path availability estimation service 816 may be located within or outside of (and connected to) a network in which a targeted path is located (where an overall availability of the targeted path is estimated by the path availability estimation service).

A network 830 can be utilized to interconnect the server computers 802A-802D and the server computer 804. The network 830 can be a local area network (LAN) and can be connected to a Wide Area Network (WAN) 840 so that end customers can access the compute service provider 800. It should be appreciated that the network topology illustrated in FIG. 8 has been simplified and that many more networks and networking devices can be utilized to interconnect the various computing systems disclosed herein.

Figure 9:
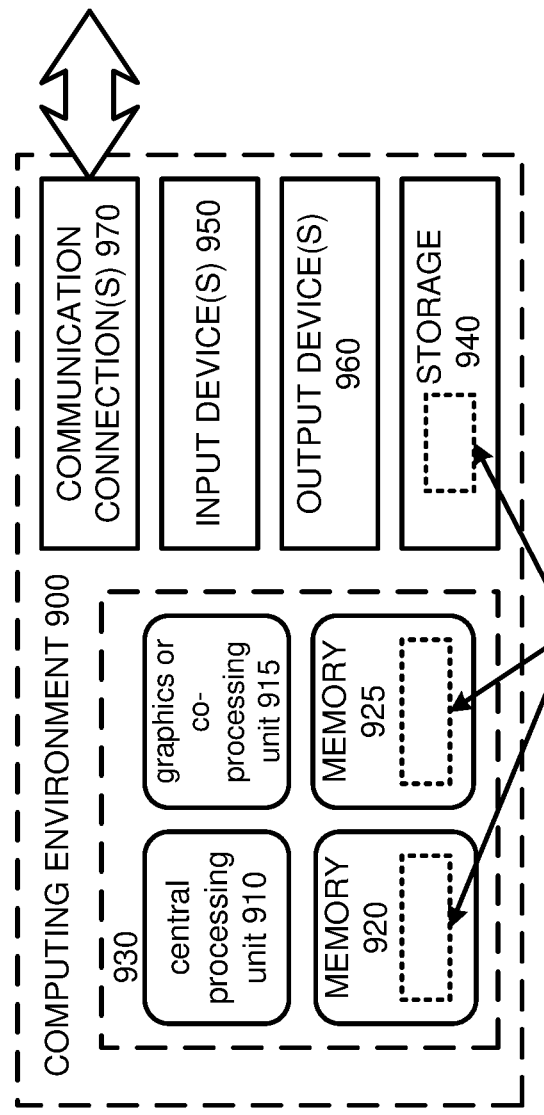
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.). In some examples, components of the system 100 of FIG. 1 may be included in and/or may comprise components of the computing environment 900. For example, the path availability estimation service 110 may be implemented via one or more computing systems including one or more of the components of computing environment 900.

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s). For example, the software 980 may include instruction executable by the processing unit(s) to perform one or more of the methods described in FIGS. 2, 3, and/or 5-7 and/or related operations.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system comprising:
a network monitoring system coupled to a network comprising a plurality of nodes including end points of an end-to-end communication path, the network monitoring system comprising:
one or more processors, and
one or more non-transitory computer-readable storage media storing instructions executable by the one or more processors to:
receive, from a plurality of data sources, connectivity and performance data measurements based on active monitoring, passive monitoring, and route monitoring operations;
apply topology information for the network to the received connectivity and performance data measurements to map the connectivity and performance data measurements to a targeted path;
compare the connectivity and performance data measurements to respective conditions;
selectively classify each of the connectivity and performance data measurements as respectively indicating that the targeted path is available or unavailable based on the comparisons of the connectivity and performance data measurements to the respective conditions;
aggregate the classified connectivity and performance data measurements to determine an overall path availability score for the targeted path; and
output an indication of the overall path availability score to a graphical user interface for use in controlling an aspect of the network.

2. The system of claim 1, wherein the overall path availability score is determined to be a binary value corresponding to an unavailable path while any of the connectivity and performance data measurements are classified as indicating that the targeted path is unavailable.

3. The system of claim 1, wherein the indication of the overall path availability score is output to a network management service configured to adjust traffic routing in the network based on the overall path availability score.

4. The system of claim 1, wherein the overall path availability score is determined to be a non-binary value.

5. The system of claim 4, wherein aggregating the classified connectivity and performance data measurements includes applying weights to the connectivity and performance data measurements, and wherein a contribution of each connectivity and performance data measurement to the overall path availability score is based on the applied weights.

6. A method comprising:
receiving, from a plurality of data sources, connectivity and performance data measurements corresponding to a communication path through a network, the plurality of data sources including an active monitoring service, a passive monitoring service, and a route monitoring service;
combining the connectivity and performance data measurements with network topology data to generate path availability indicators corresponding to the connectivity and performance data measurements;
calculating an overall path availability score for the communication path based on the path availability indicators; and
generating an output corresponding to the overall path availability score, the output configured to control a targeted system to perform an action relating to a corresponding availability of the network based on the overall path availability score.

7. The method of claim 6, wherein generating the output includes generating a representation of the overall path availability score for display via a graphical user interface of a client or administrator computing device.

8. The method of claim 6, wherein combining the connectivity and performance data measurements with topology data includes determining, for each measurement, whether the measurement indicates that the communication path is available or unavailable based on a comparison of the measurement to a respective condition.

9. The method of claim 8, wherein the respective condition corresponds to an acceptable connectivity or performance level for a category of connectivity and performance data associated with the measurement based on a Service Level Agreement (SLA).

10. The method of claim 8, wherein the respective condition corresponds to an adaptive or static threshold.

11. The method of claim 8, wherein combining the connectivity and performance data measurements with topology data includes determining, for each measurement, a level of availability indicated by the measurement based on a difference between the measurement and the respective condition.

12. The method of claim 11, wherein the path availability indicators comprise binary indicators, and wherein calculating the overall path availability score includes determining the overall path availability to be a first binary value, corresponding to an available path, responsive to each of the path availability indicators indicating that the communication path is available, and determining the overall path availability to be a second binary value, corresponding to an unavailable path, responsive to at least one of the path availability indicators indicating that the communication path is unavailable.

13. The method of claim 11, wherein the path availability indicators comprise binary indicators, and wherein calculating the overall path availability score includes determining the overall path availability to be a first binary value, corresponding to an available path, responsive to an availability threshold number of the path availability indicators indicating that the communication path is available, or determining the overall path availability to be a second binary value, corresponding to an unavailable path, responsive to an availability threshold number of the path availability indicators indicating that the communication path is unavailable.

14. The method of claim 11, wherein, for each of the connectivity and performance data measurements, the level of availability indicated by the measurement is weighted based on a category of the measurement or based on a utilization of a device, path, or link associated with the measurement to generate a respective weighted path availability indicator.

15. The method of claim 14, wherein calculating the overall path availability score includes determining the overall path availability based on an aggregation of the weighted path availability indicators for the connectivity and performance data measurements.

16. One or more non-transitory computer-readable storage media storing computer-executable instructions for causing a computing system to perform a method, the method comprising:

receiving connectivity and performance data measurements for a network based on active monitoring, passive monitoring, or route monitoring operations in the network;

receiving topology information for the network;

classifying the connectivity and performance data measurements in relation to a targeted path through the network based on a combination of the the active monitoring, passive monitoring, or route monitoring operations and the topology information to generate classified connectivity and performance data measurements;

determining a plurality of availability indicators for the targeted path based on a comparison of the classified connectivity and performance data measurements to respective thresholds;

aggregating the plurality of availability indicators to determine an overall path availability score for the targeted path; and outputting an indication of the overall path availability score to a graphical user interface for use in controlling an aspect of the network.

17. The one or more non-transitory computer-readable storage media storing computer-executable instructions of claim 16, wherein the plurality of availability indicators comprise binary indicators of availability, and wherein aggregating the plurality of availability indicators comprises applying the binary indicators of availability to a logical Boolean operation to output the overall path availability score, wherein the overall path availability score comprises a binary value indicating whether the targeted path is estimated to be available.

18. The one or more non-transitory computer-readable storage media storing computer-executable instructions of claim 16, wherein the connectivity and performance data measurements are generated by a plurality of data sources including network devices along the targeted path and external monitoring devices outside of the targeted path.

19. The one or more non-transitory computer-readable storage media storing computer-executable instructions of claim 16, wherein aggregating the plurality of availability indicators comprises applying respective weights to each indicator of the plurality of availability indicators based on a category of connectivity or performance measurement associated with the indicator to generate weighted availability indicators, and aggregating the weighted availability indicators to generate the overall path availability score.

20. The one or more non-transitory computer-readable storage media storing computer-executable instructions of claim 19, wherein the overall path availability score comprises a non-binary value indicating an estimated percentage of availability based on the aggregated weighted availability indicators.

* * * * *